(No Model.)
R. J. WATTS.
NON-REFILLABLE BOTTLE.
No. 563,339. Patented July 7, 1896.
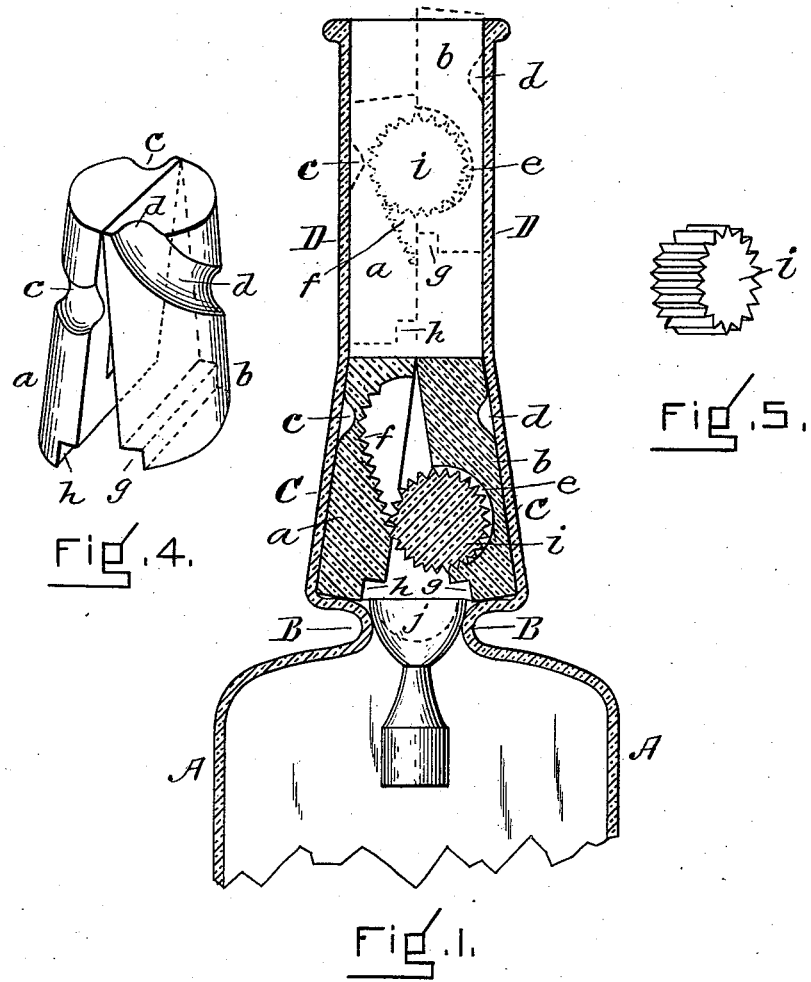
WITNESSES
Frank G. Parker
H. K. Porter
INVENTOR
Richard J. Watts
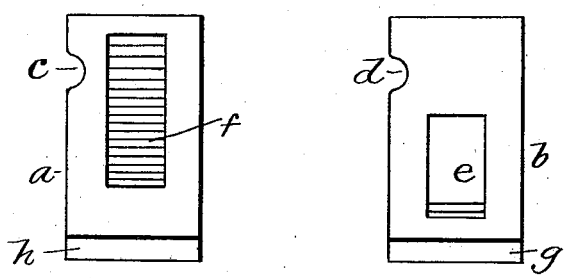

UNITED STATES PATENT OFFICE.

RICHARD J. WATTS, OF CAMBRIDGE, MASSACHUSETTS.

NON-REFILLABLE BOTTLE.

SPECIFICATION forming part of Letters Patent No. 563,339, dated July 7, 1896.

Application filed April 6, 1896. Serial No. 586,294. (No model.)

*To all whom it may concern:*

Be it known that I, RICHARD J. WATTS, of Cambridge, in the county of Middlesex and State of Massachusetts, have invented a new and useful Improvement in Non-Refillable Bottles, which will, in connection with the accompanying drawings, be hereinafter fully described, and specifically defined in the appended claims.

In said drawings, Figure 1 is a central vertical section of the upper portion of a bottle, showing my improved arrangement of parts which renders it non-refillable. Fig. 2 is a detached view of one of the filling-pieces shown at the left in Fig. 1. Fig. 3 is a view of a filling-piece shown at the right in Fig. 1. Fig. 4 is a view of the two parts shown in Figs. 2 and 3 and is in the relative position they occupy in the bottle-neck when therein seated as shown in Fig. 1. Fig. 5 is a detached perspective view of an interlocked piece arranged between the parts shown in Figs. 2 and 3.

The object of my invention is to so construct and arrange bottles that when once filled, and the safeguard duly applied, they can be emptied of such contents but cannot be again refilled, as it is impossible to again refill them after the safeguard has been once secured therein, as will be next pointed out, and then specified in the claims.

Referring again to said drawings, A A represent the bottle, which is of any desired size and height, the bottom portion being shown as broken away, the neck narrowed, as at B, and is then abruptly widened, and part C tapering inward extends up to part D, that is of uniform width, as shown. This constitutes the bottle proper, usually formed of glass, the neck C and D being somewhat longer than usual. I form, usually of glass, parts $a$ and $b$, each semicylindrical, and part $a$, having a spiral groove $c$, and part $b$, having a groove $d$, which grooves commence, as shown in Fig. 4, at the top near the inner face and pass spirally downward and terminate at said inner face, as shown. In the right-hand part $b$ I form a cavity $e$ near the bottom, and in part $a$ I form a cavity $f$, that extends from near its top to about the center of cavity $e$. I also provide a filling-piece $i$, that is seated in cavities $e f$, as will be explained. The assembling of said described parts is done as follows: Piece $i$ is seated in cavity $e$, and part $a$ is then so placed that the deepest part of recess $f$ is over part $i$, which brings part $a$ considerably below part $b$, as shown by dotted lines in Fig. 1. When said parts $a$, $b$, and $i$ are thus assembled, they are entered in part D, and are thus forced down till piece $a$ has reached the bottom of part C, when $b$ will continue downward till it is even with part $a$, the part $i$ moving down on part $a$ to the position shown in Fig. 1, the recess in part $b$ having teeth near its bottom that engage the teeth in part $i$, and the same is true of the elongated recess in part $a$, but part $i$ will not fully engage the teeth in $a$ till near the bottom.

In the portion D of part A, I arrange a piece $j$, that fits therein, but will not pass through it, and it extends within part $a$ a sufficient distance to always hold it in proper balance, and parts $a$ and $b$ are at their lower end near the center cut away at $g h$, so that when part $j$ is moved outward from the neck of the bottle it will pass somewhat into parts $a b$.

In the application of my invention I first fill bottle A nearly to part B. I then insert stopper $j$, as shown. Then parts $a$, $b$, and $i$ are assembled, as indicated by dotted lines, Fig. 1, and are inserted in neck D and are moved down into the position shown at C, where both $a$ and $b$ rest upon the neck just above B, and part $i$ has passed down to the position there indicated, while parts $a b$ are separated at their bottom, but are in contact at their top; and when the bottle is so far inverted as to move stopper $j$ outward liquid in the bottle will pass the same, and passing along the space between $a$ and $b$ it will escape through the spiral passages $c d$, that lead from said space out at the top of $a$ and $b$; but, on the other hand, liquid cannot be passed into the bottle after it has been once emptied, as stopper $j$ constantly prevents its inlet into the bottle.

Instead of forming piece $i$ as shown, it can be formed cylindrical, or rounded upon its edges with parallel ends, as shown, as may be preferred, but I deem the form shown to be preferable.

Having thus described my invention, what I claim as new, and desire to secure by Letters Patent, is—

1. As a non-refillable bottle, the part A narrowed as at B, a stopper $j$ fitted therein to move outward but not to pass below part B, and formed with requisite extension into the bottle: the neck of the bottle formed with inwardly-tapering portion C and parallel portion D, with the parts $a$ and $b$ formed to fill neck D and with grooves $c$ and $d$ starting at top of $a$, $b$, and entering the space between said parts, with a piece $i$ seated in part $b$ and extending into part $d$, and serving to hold part $a$ against the wall of neck C, when seated therein, all substantially as specified.

2. In combination with bottle A, having a tapering portion C and parallel portion D, an elongated stopper $j$ inserted in the bottle at the narrowed portion B, and parts $a$, $b$, slightly reduced at $g$, $h$, to allow stopper $j$ to move outward: with a part $i$ arranged to engage and hold said parts asunder at the bottom, and grooves $c$, $d$, at their top to allow the escape of liquid from between the same, all substantially as specified.

RICHARD J. WATTS.

Witnesses:
MAURICE V. BRESNAHAN,
HENRY K. PORTER.